United States Patent [19]

Thomas

[11] Patent Number: 5,048,724
[45] Date of Patent: Sep. 17, 1991

[54] SOFT SERVE FROZEN CONFECTION DISPENSER

[75] Inventor: Donald J. Thomas, Carmel, Ind.

[73] Assignee: FedPak Systems, Inc., Indianapolis, Ind.

[21] Appl. No.: 456,234

[22] Filed: Dec. 27, 1989

Related U.S. Application Data

[63] Continuation of Ser. No. 273,101, Nov. 22, 1988, abandoned.

[51] Int. Cl.$^5$ .............................................. B65D 35/28
[52] U.S. Cl. ..................................... 222/95; 222/105; 222/146.6; 222/389; 62/377
[58] Field of Search ...................... 222/95, 94, 96, 105, 222/389, 146.6, 144.5, 160, 183, 387; 62/377, 389

[56] References Cited

U.S. PATENT DOCUMENTS

| 2,120,640 | 6/1938 | Craemer . | |
|---|---|---|---|
| 2,401,417 | 6/1946 | Engle . | |
| 2,408,704 | 10/1946 | Taylor | 222/160 |
| 3,081,920 | 3/1963 | Gorychka et al. | 222/509 |
| 3,155,281 | 11/1964 | Stracey . | |
| 3,162,439 | 12/1964 | Poland et al. . | |
| 3,178,061 | 4/1965 | Giacalone et al. | 222/146.6 X |
| 3,371,822 | 3/1968 | Galloway . | |
| 3,435,996 | 4/1969 | Jones | 222/386.5 |
| 3,677,443 | 7/1972 | Smadar et al. . | |
| 3,826,409 | 7/1974 | Chilcoate . | |
| 3,847,388 | 11/1974 | Lynch . | |
| 3,968,960 | 7/1976 | Fedor et al. . | |
| 4,120,491 | 10/1978 | Lang | 271/187 |
| 4,163,802 | 8/1979 | Redfern et al. . | |
| 4,213,545 | 7/1980 | Thompson et al. | 222/386.5 |
| 4,228,997 | 10/1980 | Schoonmaker et al. . | |
| 4,231,492 | 11/1980 | Rios | 222/95 X |
| 4,293,082 | 10/1981 | Matsueda | 222/146.6 X |
| 4,431,177 | 2/1984 | Beery et al. | 271/187 |
| 4,439,083 | 3/1984 | Jenkins et al. | 271/187 |
| 4,452,823 | 6/1984 | Connolly et al. . | |
| 4,501,418 | 2/1985 | Ariga et al. | 271/315 |
| 4,574,987 | 3/1986 | Halligan et al. . | |
| 4,638,993 | 1/1987 | Granzow et al. | 271/187 |
| 4,651,538 | 3/1987 | Bull et al. | 62/398 |
| 4,711,376 | 12/1987 | Manfroni | 222/509 X |
| 4,718,655 | 1/1988 | Okayama et al. | 271/315 |
| 4,723,688 | 2/1988 | Munoz | 222/386.5 |
| 4,753,371 | 6/1988 | Michielin et al. | 222/145 X |
| 4,883,265 | 11/1989 | Iida et al. | 271/220 |
| 4,916,493 | 4/1990 | DeVito . | |

FOREIGN PATENT DOCUMENTS

| 232366 | 11/1985 | Japan | 271/220 |
|---|---|---|---|
| 154570 | 6/1988 | Japan | 271/315 |
| 212664 | 9/1988 | Japan | 271/187 |
| 64-9587 | 1/1989 | Japan . | |
| 48768 | 2/1989 | Japan | 271/220 |
| 252454 | 10/1989 | Japan | 271/187 |
| 261161 | 10/1989 | Japan | 271/220 |
| PCT/AU86/-00361 | 11/1986 | PCT Int'l Appl. . | |
| PCT/GB88/-01054 | 12/1988 | PCT Int'l Appl. . | |
| 311823 | 2/1956 | Switzerland | 271/187 |
| 1509329 | 8/1989 | U.S.S.R. | 271/187 |

Primary Examiner—Michael S. Huppert
Assistant Examiner—P. Derakshani
Attorney, Agent, or Firm—Barnes & Thornburg

[57] ABSTRACT

An apparatus is provided for dispensing soft serve frozen confections such as ice creams and yogurts. A collapsible container is adapted to contain a frozen confection and is formed to include an outlet of sufficient size to permit extrusion of frozen confection into an outlet conduit. The apparatus also includes a cold storage locker to cool the container and any frozen confection contained therein and maintain the frozen confection at a predetermined tempered subfreezing temperature to preserve the frozen confection in a soft serve condition. A compressive force, such as may be applied by a piston moved in a cylinder, causes extrusion of the frozen confection from the container into the outlet conduit. A dispensing spigot is connected to the outlet conduit to permit service of the frozen confection at the predetermined tempered subfreezing temperature.

14 Claims, 4 Drawing Sheets

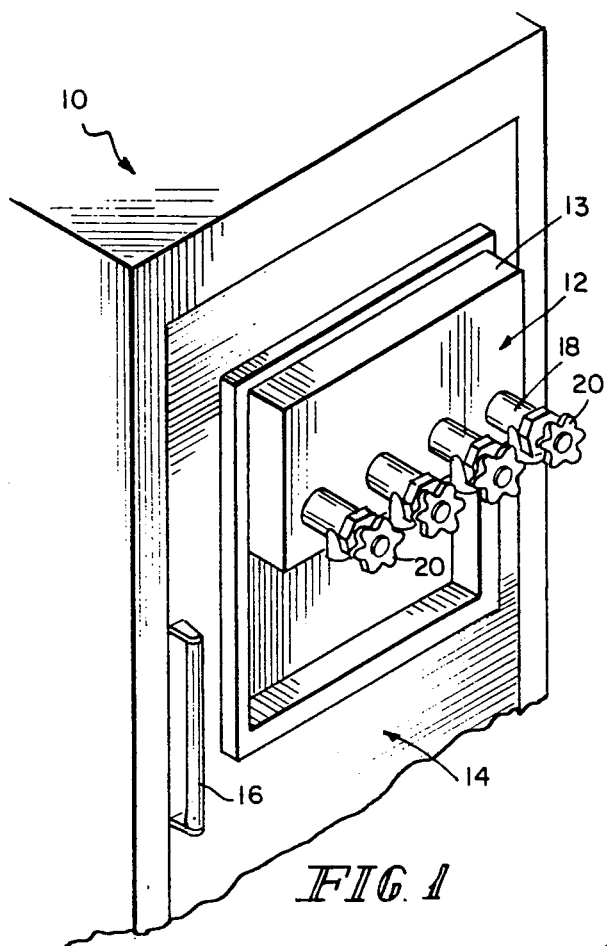
FIG. 1
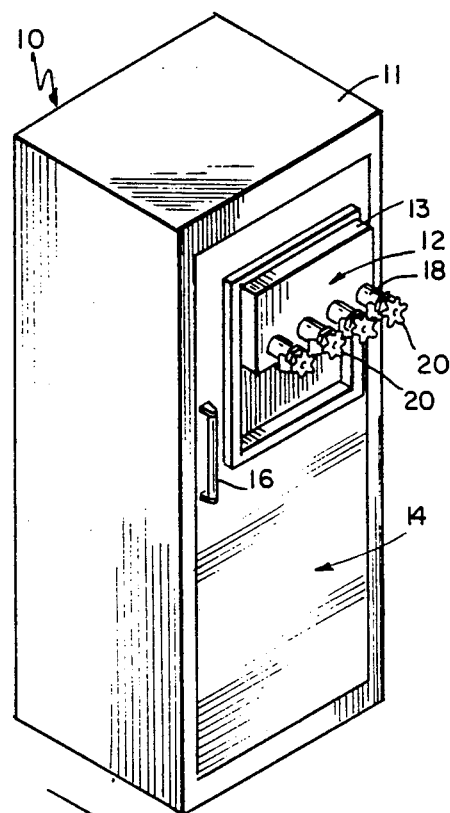
FIG. 3
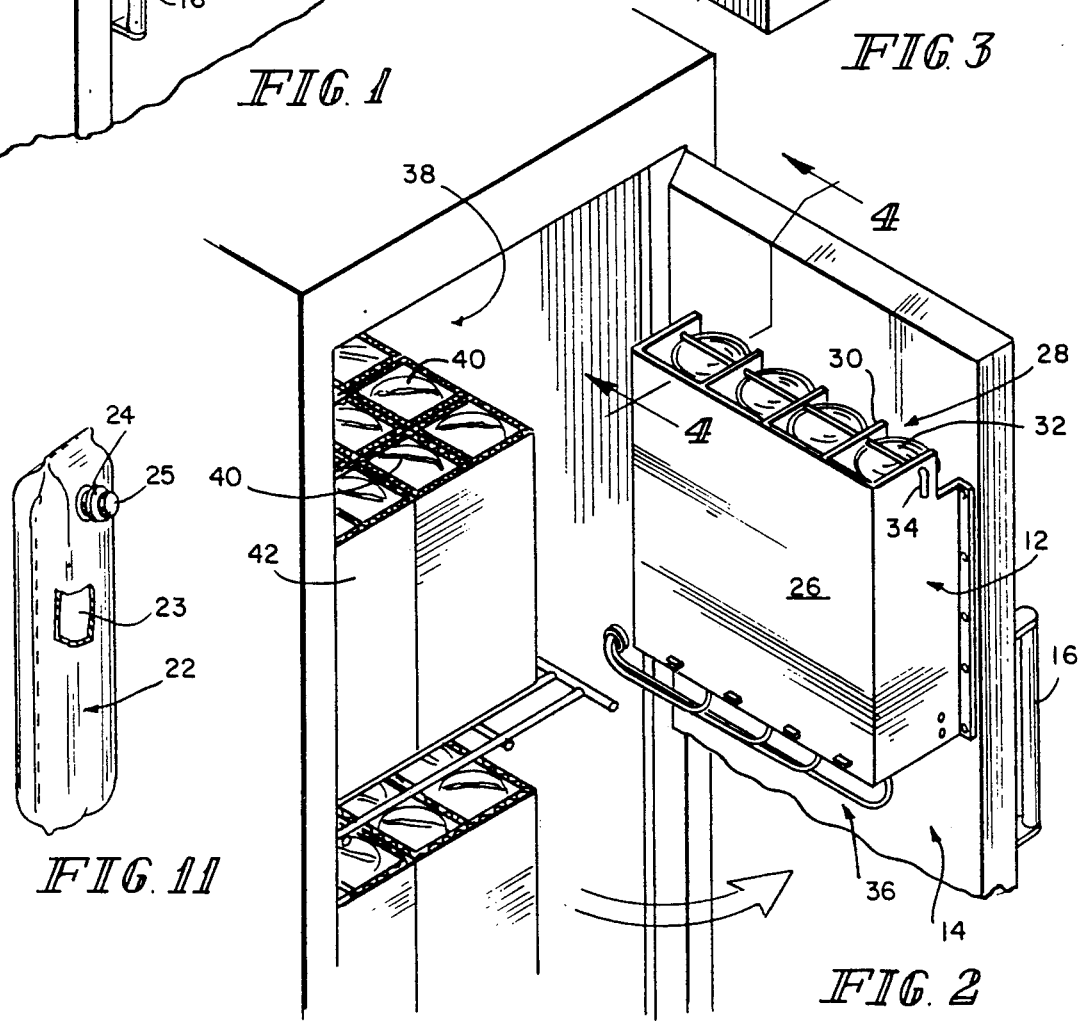
FIG. 11
FIG. 2

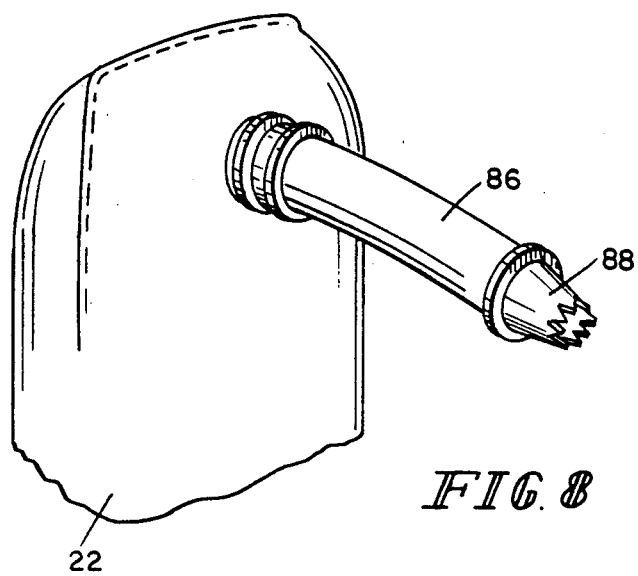
FIG. 8
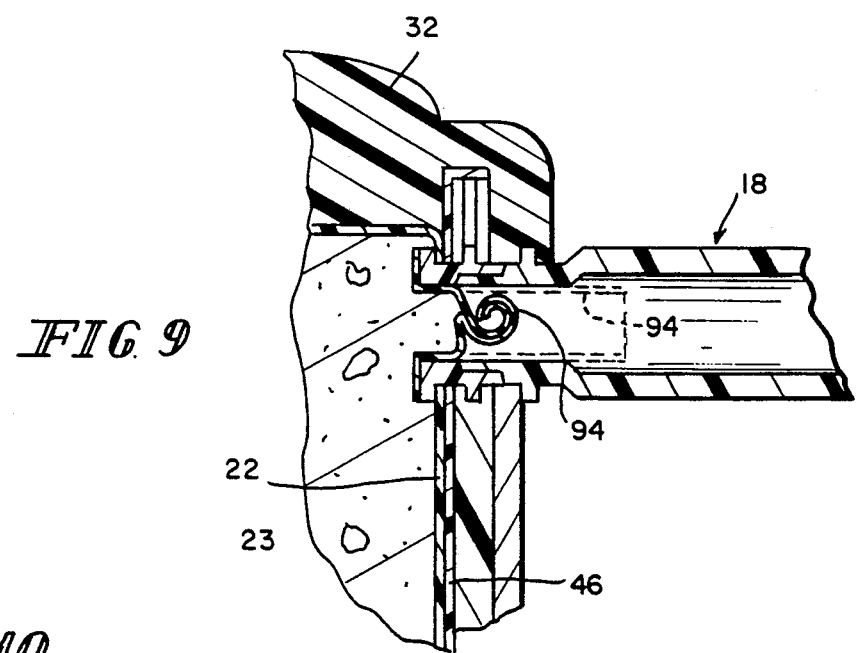
FIG. 9
FIG. 10
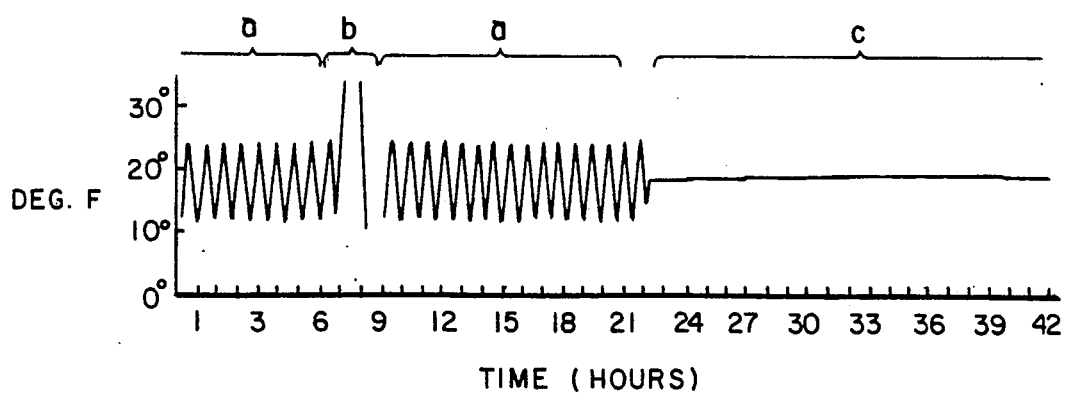

5,048,724

SOFT SERVE FROZEN CONFECTION DISPENSER

This is a continuation of application Ser. No. 273,101 filed Nov. 22, 1988 now abandoned.

BACKGROUND AND SUMMARY OF THE INVENTION

This invention relates to an apparatus and method for dispensing soft serve food products such as ice creams, yogurts, sherbets, and other frozen dessert confections.

Soft serve frozen confections are widely used in the food industry and have a broad customer appeal. Although ice creams are the most widely known product dispensed in a soft serve form, an expanding market based on alternative frozen confections such as yogurts also exists. A soft serve confection is dispensed by extrusion into an edible cone or other suitable container, and is generally intended for immediate consumption.

A soft serve confection can be easily extruded from the dispensing apparatus in a variety of patterns or shapes. A common manner of dispensing a frozen confection consists of extruding a continuous ribbon or rod that can be coiled on itself to form a cone having a beehive shape. Soft serve confections ideally will have sufficient strength to retain the extrudate shape for a period of time, even when subjected to changes in orientation such as would occur during consumption.

The dispensing temperature of the soft serve frozen confection typically ranges from about 16° F. to 21° F. This temperature range is critical, with lower temperatures being characterized by difficulties in extrusion of the soft serve frozen confection, mechanical hardness, and inferior taste quality due to the adverse reaction of taste buds to a low temperature frozen confection, often resulting in a "burning" sensation. Temperatures higher than the normal soft serve confection dispensing range result in a low viscosity product with undesirable rheological characteristics that do not permit retention of the extrudate shape and are unsuitable for later processing such as dipping in chocolate or crushed nutmeats.

Because of the critical narrow temperature range for soft serve frozen confections it is not feasible to transport the frozen confections at their normal dispensing temperature.

To overcome this problem, the food service industry presently utilizes on-site production of the soft serve frozen confections. The soft serve confection can be shipped from the manufacturer to the food product retailer as a powder, a refrigerated liquid, or in a frozen state. If the confection is not in a liquid state, it is converted to the liquid state at the site of the food product retailer. For example, a confection shipped in the frozen state is allowed to completely thaw to liquid form, or water is added to the powdered form. This liquid is converted on-site to a soft serve frozen confection by an agitated freezing process in a soft serve frozen confection dispenser.

Although on-site production of the soft serve frozen confection permits the successful manufacture and service of soft serve frozen confections, the method does present some problems of its own. The machinery necessary for on-site production is complicated and expensive. Scraper blades that agitate the frozen confection during its on-site formation require sharpening or replacement, and inadvertent freeze-up of the machinery is a continual worry. The cost in electricity for operating the freezing unit is substantial, and special heavy duty electric wiring may be necessary to handle the power requirements of the freezer. Because of the agitation process, addition of extra elements, such as nutmeats, candies or fruits, to the soft serve confection is normally impossible. Frequent regular cleaning of the parts of the frozen confection dispenser is also necessary to prevent blockage and reduce the chance of bacterial contamination.

A further disadvantage of the on-site production is the increased risk of bacterial contamination presented at each stage of the process. Although the liquid is refrigerated, the chance of bacterial contamination is greatly increased over the frozen form. This danger is increased by the possibility of improper cleaning of the machinery, which could result in a seed culture of bacteria capable of contaminating newly added liquid confection. Additionally, quality control of on-site producers of soft serve confections can be inferior as compared to a central manufacturer, resulting in uneven product appearance, taste, and form.

It is accordingly an object of the present invention to provide a soft serve frozen confection dispenser capable of extruding a soft serve frozen confection and suited for use in a commercial setting.

Another object of the invention is to provide a device for dispensing soft serve confections that is sanitary, mechanically simple, easy to clean, draws small amounts of electric power, and in specific embodiments is capable of portable use.

It is a further object of the present invention to provide a device that is capable of serving a soft serve frozen confection without the formation of undesirable ice crystals in the frozen confection.

Yet another object of the present invention is to provide a device that is capable of dispensing soft serve frozen confections which include extra flavoring ingredients such as fruit or candy pieces.

The present invention accordingly comprises an apparatus and method of providing a soft serve frozen confection dispenser that is capable of dispensing certain products such as yogurt in a soft serve form free of the undesirable characteristics formerly associated with such soft serve yogurt products.

According to the present invention an apparatus and method for dispensing soft serve frozen confections in general, and particularly those confections which are difficult to maintain or prepare in a state suitable for soft serve is provided. In one embodiment, a collapsible container impervious to liquids is adapted to contain a frozen confection. The collapsible container has one outlet of sufficient size to allow extrusion of a frozen confection into an outlet conduit. If large chunks of fruits, candies or nuts are added to the frozen confection, the collapsible container outlet is large enough to permit passage of the chunks. Generally, a one inch diameter outlet will be sufficiently large to permit extrusion of the frozen confection and any contained fruit, nuts, candies or similar additive flavorants into an outlet conduit.

The collapsible container outlet may optionally include an integral attached sleeve that flexibly unwinds in an outlet conduit under the pressure of the extruded frozen confection, and acts as a disposable barrier that prevents contamination of the extruded soft serve frozen confection by the outlet conduit and limits the amount of contact the outlet conduit has with the extruded soft serve frozen confection.

The outlet conduit of the dispensing apparatus is affixable to the collapsible container outlet and is capable of receiving the extruded soft serve frozen confection. The outlet conduit contains a valve that is controllable to limit extrusion of the soft serve frozen confection. For example, the valve can be a rotating action shut-off spigot or a vertical plunger shut-off. If the outlet conduit is constructed of a resilient, flexible material, the valve can be a device that enables constriction of the outlet conduit.

Extrusion of a soft serve frozen confection from the dispensing apparatus can be accomplished with a compression arrangement that exerts compressive forces on the collapsible bag. The compression arrangement must have sufficient force to enable extrusion of the soft serve frozen confection from the collapsible container into the outlet conduit. A bellows, capable of being expanded by air under pressure, is a suitable compression arrangement. Additional suitable compression means, such as hydraulically or mechanically operated pistons may also be used in the present invention.

An air pressure relief valve can either manually or automatically provide air pressure relief for the bellows. Collapsing the bellows enables replacement of an empty collapsible container with a filled replacement collapsible container, and protects the food service worker from any potential hazards that might be presented by a pressurized bellows. As an additional safety feature, in one embodiment of the present invention, the air pressure in the bellows can be automatically relieved upon opening the container door of the soft serve frozen confection dispenser apparatus.

The dispensing apparatus includes a freezer section for maintaining the soft serve frozen confection substantially within the normal soft serve dispensing temperature range of 17° F. to 21° F. Ideally, the freezer section will be sufficiently large to contain replacement collapsible containers filled with soft serve frozen confections as well as maintain the soft serve frozen confection in the dispensing section of the dispensing apparatus within the normal soft serve dispensing temperature range.

The soft serve frozen confection held by the collapsible container in the dispensing section has an ideal dispensing temperature. The dispensing section includes thermal insulation means for maintaining the soft serve frozen confection at a constant ideal dispensing temperature. The maintenance of a constant temperature within the dispensing section inhibits ice crystal formation in the soft serve frozen confection that can result from temperature changes such as are encountered in the cyclic temperature fluctuations that normally result from the duty cycle of a freezing unit. The thermal insulation means can be a layer of foam or other passive thermal insulation which completely or partially surrounds the collapsible containers.

BRIEF DESCRIPTION OF THE DRAWINGS

For a fuller understanding of the nature and objects of the invention, reference should be made to the following detailed description and the accompanying drawings, in which:

FIG. 1 shows an exterior view of the frozen confection dispensing apparatus according to the present invention;

FIG. 2 is a partial interior view of the dispensing section, and shows the collapsible container of the present invention;

FIG. 3 shows an exterior view of the entire dispensing section;

FIG. 8 is a view of a dispensing conduit having an attached decorative nozzle;

FIG. 9 is a partial cross sectional view of the frozen confection dispensing apparatus showing a collapsible container having an attached segment that in operation unfolds to project outward into the dispensing conduit; and FIG. 10 is a time/temperature graph which shows the temperature of the dispensing section with both the normal refrigerator cyclic temperature variations, and when insulated in a manner such that the dispensing section becomes thermally stable.

FIG. 11 shows a collapsible container of the present invention and has a cut-away view showing the soft serve frozen confection.

DETAILED DESCRIPTION OF ILLUSTRATED EMBODIMENTS

Figure 4:
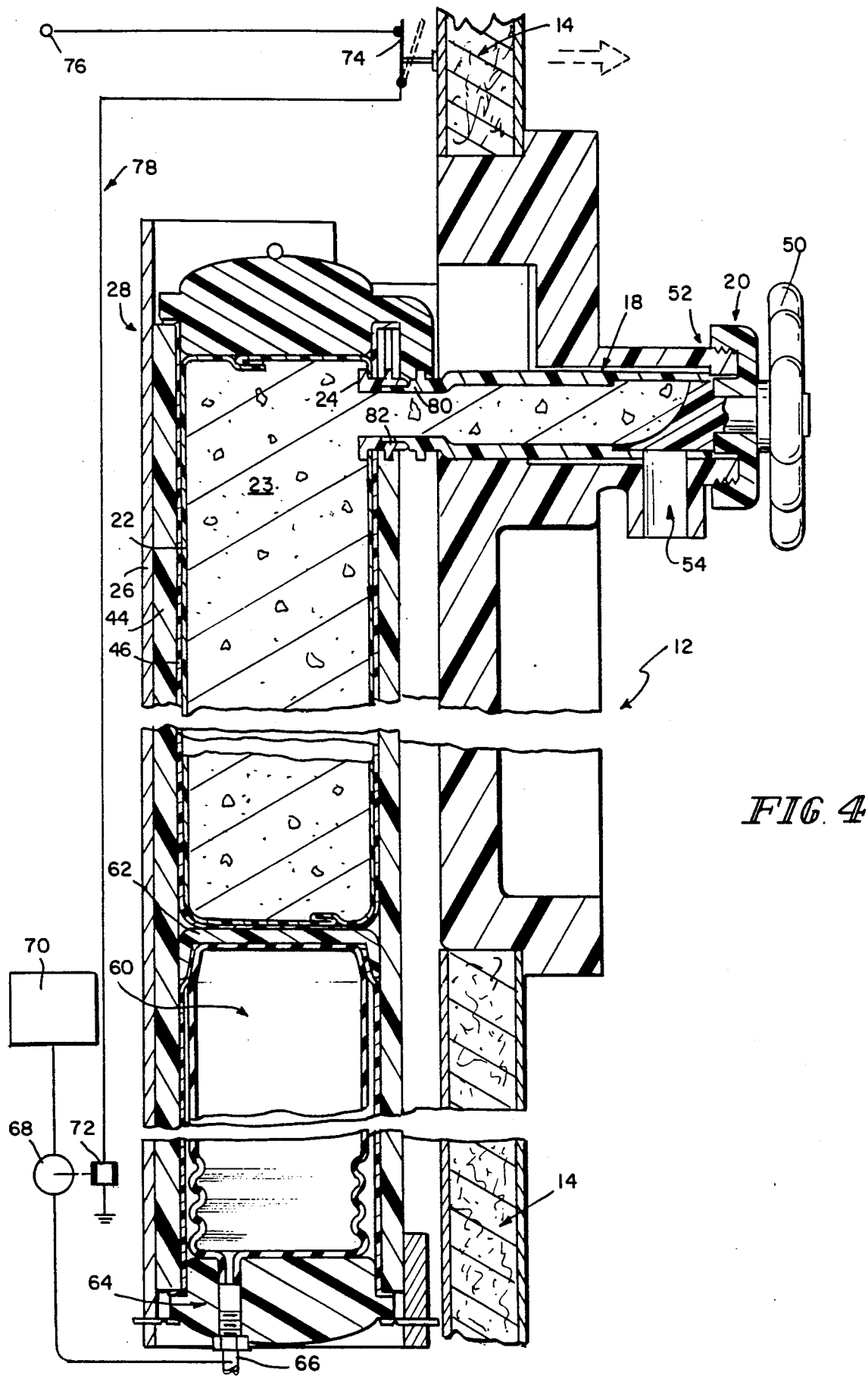
FIG. 4 is a partial cross sectional view of the frozen confection dispensing apparatus embodying features of the present invention.

FIG. 1 is a partial view of a soft serve frozen confection dispenser apparatus 10 with an outer casing 11. A dispensing section 12, having a conduit casing 13 extends through a container door 14 of the apparatus 10. Extending outward from the conduit casing 13 is at least one dispensing conduit 18. The illustrated embodiment shown in FIG. 1 has four dispensing conduits 18, linearly aligned at equal intervals across the conduit casing 13. Each dispensing conduit 18 terminates with a manually operated valve 20 (the details of which will be discussed below in the discussion related to FIG. 4) capable of completely closing off the dispensing conduit 18. Access to the interior of the apparatus 10 is aided by the use of a door handle 16.

FIG. 3 is a complete view of soft serve frozen confection dispenser apparatus 10, presented to indicate the relative sizes of dispensing section 12 and the entire apparatus 10. The outer casing 11 of the apparatus 10 is ideally insulated to reduce heat transfer from the exterior environment to the interior of the apparatus 10. The interior temperature of the apparatus 10 should ideally be maintained within the normal range for soft service of frozen confections, approximately 17° F. to 21° F. When properly insulated, only a small freezing unit is needed to adequately compensate for heat gains from the exterior environment acquired through the outer casing 11 and upon opening of the container door 14. Certain portable embodiments of the invention (some of which will be described later) can dispense with an electrically powered refrigerating unit if blocks of dry ice are provided to maintain the normal soft service temperature. This would permit operation of the invention in areas where electrical power is prohibitively difficult to acquire or completely unavailable. Mobile transport of the soft serve frozen confection dispenser is also facilitated if electrical power is not necessary for the operation of the invention.

FIG. 11 is a view of collapsible container 22, with a cut away view revealing the soft serve frozen confection 23. The collapsible container 22 can be constructed from any material that is substantially impervious to fluids. A preferred embodiment involves the use of disposable plastic material. The collapsible container 22 may also be constructed from materials selected for their thermal insulation properties. The collapsible container 22 is fitted with a collapsible container outlet 24, which has a removable covering cap 25. Sealing the container 22 after filling with cap 25 ensures that the soft serve frozen confection is maintained in a sanitary state while being shipped to the use site. Before use, the cap 25 is easily removed.

FIG. 2 is a partial interior view of the apparatus 10. The container door 14 is opened to reveal storage area 38, which contains multiple replacement collapsible containers 40, collected together in a transport package 42. The transport package 42 can be constructed of a thermally insulative material.

In operation, the soft serve frozen confection 23 is bagged in a collapsible container 22, collected together with other similar units in a transport package 42 and shipped in a hard frozen state at sub-zero Fahrenheit temperatures. The transport package 42, containing the soft serve frozen confection 23 in a hard frozen state, is placed in the storage area 38 and allowed to slowly thaw to the normal dispensing temperature range (17° F.–21° F.) for soft serve confections in a process known as "tempering". After the soft serve frozen confection 23 has been tempered, the temperature of the confection 23 must be maintained at a constant level to prevent localized melting and refreezing which could result in an unappetizing crystallization of the soft serve frozen confection 23.

To maintain the confection 23 at a constant temperature, the dispensing unit 12 includes an insulated interior holder 26 which is divided into multiple receptacles 28 by partition walls 30. Each of the receptacles 28 is adapted to contain one of the collapsible containers 22 filled with the soft serve frozen confection 23. Since each collapsible container 22 is compressed during operation of the invention, a pressure lid 32, held in place by a keeper bar 34, is provided to ensure that the collapsible container 22 is not forced out of its proper position in the receptacle 28. Air pressure lines 36 provide air having a pressure of about 25 psi to each receptacle 28 to provide the necessary compressing force for extrusion of the confection 23.

The pressure lid 32 can be constructed of any material having sufficient strength to withstand the compressive forces exerted to enable extrusion of the soft serve frozen confection 23. A fluid-tight seal between a pressure lid 32 and receptacle 28 is not necessary for operation of the invention. The keeper bar 34 is also constructed of a material sufficient to withstand the compressive forces exerted to enable extrusion of the soft serve frozen confection 23. In the embodiment shown in FIG. 2, the keeper bar 34 is a rod with one end bent to allow correct lateral placement of the keeper bar 34. The rod is inserted through a linear series of holes in the insulated interior holder 26 and partition walls 30. The holes are placed directly above the multiple pressure lids 32. Insertion of the keeper bar 34 through the holes prevents upward displacement of the pressure lids 32 by the compressive forces exerted on the container 22 to extrude the soft serve frozen confection 23.

Alternative systems for ensuring that collapsible container 22 remain properly sited in the receptacles 28 can also be used. That a variety of locks, latches, screw attachments, sliding panels, or other similar systems will also prevent displacement of the collapsible container 22 can easily be appreciated by those skilled in the art. Also, appropriately designed interlock systems for selectively preventing the removal of pressure lids 32 can also be used as will be appreciated by those skilled in the art.

FIG. 4 is a cross sectional view of a preferred embodiment of the dispensing section 12 according to the present invention. In this preferred embodiment, the compressive force necessary to cause extrusion of the soft serve frozen confection 23 from the collapsible container 22 is provided by placing an expandible bellows arrangement under pressure. Specifically, compressive force is applied to the collapsible container 22 through the use of a bellows 60 that vertically expands in the receptacle 28. Expansion of the bellows 60 is realized through admittance of air pressurized to about 25 psi. The pressurized air is provided by a pressure source 70, connected to the bellows 60 through a pressure hose 66 and pressurizing conduit 64. The pressure hose 66 is interrupted at some point along its length by a solenoid controlled pressure valve 68.

To close the pressure valve 68, a mechanical switch 74 is provided that is opened as a result of the opening of the container door 14. When the mechanical switch 74 is opened, an interruptible circuit 78, having electrical power source 76, is broken. Without electrical power, solenoid 72 controlling the solenoid controlled pressure valve 68, will not have a magnetic field sufficient to maintain the solenoid controlled pressure valve 68 in the pressurizing position. The solenoid controlled pressure valve 68 is designed so that in the absence of a magnetic field generated by solenoid 72, the pressure in the bellows 60 is relieved. The solenoid controlled pressure valve 72 can be constructed to provide pressure relieve to pressure source 70 if desired. For portable embodiments of this invention, in which the pressure source 70 is ideally a pressurized nitrogen tank, the solenoid controlled pressure valve 72 should not relieve the pressure in the pressure source 70 when the pressure in the bellows 60 is relieved.

Relieving pressure from the bellows 60 when the container door 14 is open is a safety feature that prevents injury to a food service worker from any article that could be forcefully expelled from receptacles 28 if the bellows 60 were under pressure. The relief of bellows pressure is also necessary to safely effectuate removal of an empty collapsible container 22, and insert a replacement collapsible container 40 filled with tempered soft serve frozen confection 23. Alternative embodiments of this invention provide for manual relief of bellows pressure and pressure indicators showing the safe range of pressures for operation of this invention.

The top of bellows 60 does not directly contact the collapsible container 22. An intermediary bellows plate 62, able to slidably move in an axial direction in receptacles 28, is provided that contacts on its lower surface the bellows 60. The upper surface of the bellows plate 62 contacts a friction reduction layer 46. The friction reduction layer 46 consists of a low friction material such as a nylon bag or smooth cardboard that tightly surrounds the collapsible container 22 and acts to both reduce the frictional engagement of the collapsible container 22 with the walls of receptacle 28 and to increase the ease of collapsible container 22 insertion into the receptacle 28. The friction reduction layer 46 can also prevent leakage of any soft serve frozen confection into the bellows 60 that could result from loss of fluid integrity of the collapsible container 22. As an additional feature, the friction reduction layer 46 can be equipped with handles to increase the facility with which the collapsible container 22 is inserted and removed from receptacle 28.

Compressive forces caused by bellows 60 permit extrusion of the soft serve frozen confection 23 contained in collapsible container 22 through the collapsible container outlet 24 and into the dispensing conduit 18. In the embodiment illustrated in FIG. 4 the collapsible container outlet 24 has a female coupling section 82, lockingly engageable with the male insertion section 80 of the dispensing conduit 18. The engagement is sufficiently tight to establish fluid communication between the collapsible container outlet 24 and the dispensing conduit 18.

The extruded soft serve frozen confection 23 is confined within the dispensing conduit 18 by a blocking arrangement 52. In the illustrated embodiment shown in FIG. 4 the blocking arrangement 52 is a rotating action valve 20, but it will be understood that any feasible means of reversibly blocking and unblocking fluid flow of the extruded soft serve frozen confection 23 may be used. In operation, in the configuration illustrated in FIG. 4, the valve 20 is in a closed position, with no fluid communication permitted between the dispensing conduit 18 and a dispensing spigot 54. Rotation of the valve 20, by manually operating a dispensing handle 50, brings the dispensing conduit 18 into fluid communication with the dispensing spigot 54, thereby permitting flow of the soft serve frozen confection 23 into a suitable container (not shown), such as an edible cone or paper cup, placed immediately below the dispensing spigot 54. The valve 20 is rotated to a closed position (illustrated in FIG. 4) by manually operating the dispensing handle 50 when the desired amount of soft serve frozen confection 23 has been dispensed.

Because the proper dispensing temperature of the soft serve frozen confection 23 is critical, a layer of insulation 44 is affixed to the interior of the holder 26. The holder insulation material is preferably a polystyrene foam insulator of at least a ½ inch thickness. The holder insulation 44 acts as a permanent temperature averaging blanket that minimizes the temperature fluctuations that might otherwise be experienced by the soft serve frozen confection 23 within the holder 26.

An experiment demonstrating the thermal averaging abilities of the holder insulation 44 has been made, and the results are graphically presented in FIG. 10. A normal freezer duty cycle is shown in section A of the figure. The temperature as measured inside an uninsulated holder 26 oscillates between a low of 11° F. and a high of 24° F. during a typical freezer duty cycle of between 45 and 60 minutes. The temperature also rises dramatically during the normal defrost cycle shown in section B. When the holder 26 is insulated with holder insulation 44 at the 22nd hour of the experiment, the temperature as measured inside the insulated holder 26 remains constant until the termination of the experiment. The holder insulation 44 has the effect of averaging the thermal fluctuation experienced during the normal duty cycle of a freezer.

The maintenance of a constant temperature within the holder 26 has at least two effects necessary for the service of a softserve frozen confection. First, the soft serve frozen confection 23 can be kept at a temperature ideal for dispensing. This is important because temperatures other than the ideal dispensing temperature imbue the soft serve frozen confection 23 with undesirable rheological, tactile, and taste properties. Second, the elimination of temperature variations limits the degradation in tactile and taste properties of the soft serve frozen confection 23 by crystallization. At a constant temperature, the localized melting and refreezing that leads to crystal formation does not occur. This is especially important in regard to those soft serve frozen confections such as yogurt that are very sensitive to crystallization.

Figure 5:
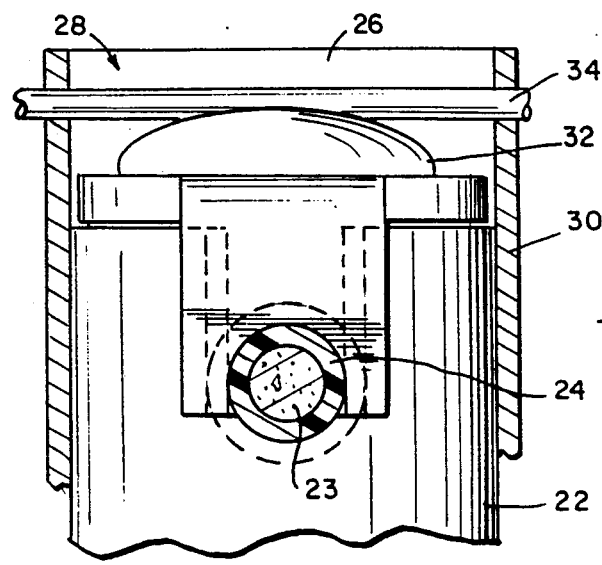
FIG. 5 is a front view of the collapsible container, showing an illustrative embodiment of the positioning of the collapsible container outlet.

FIG. 5 is a frontal view of the collapsible container 22 in position for use. The collapsible container 22 is maintained in the receptacle 28 by the partition walls 30 on two sides and by the pressure lid 32 on top. As described above, the pressure lid 32 is kept in place under compressive force by the keeper bar 34 which runs through holes linearly arranged in the partition walls 30. The collapsible container outlet 24 is maintained in the proper position for lockable engagement with the dispensing conduit 18 (not shown in FIG. 5) by a collapsible container retention ring 90 sited in a retention slot 92.

Figure 6:
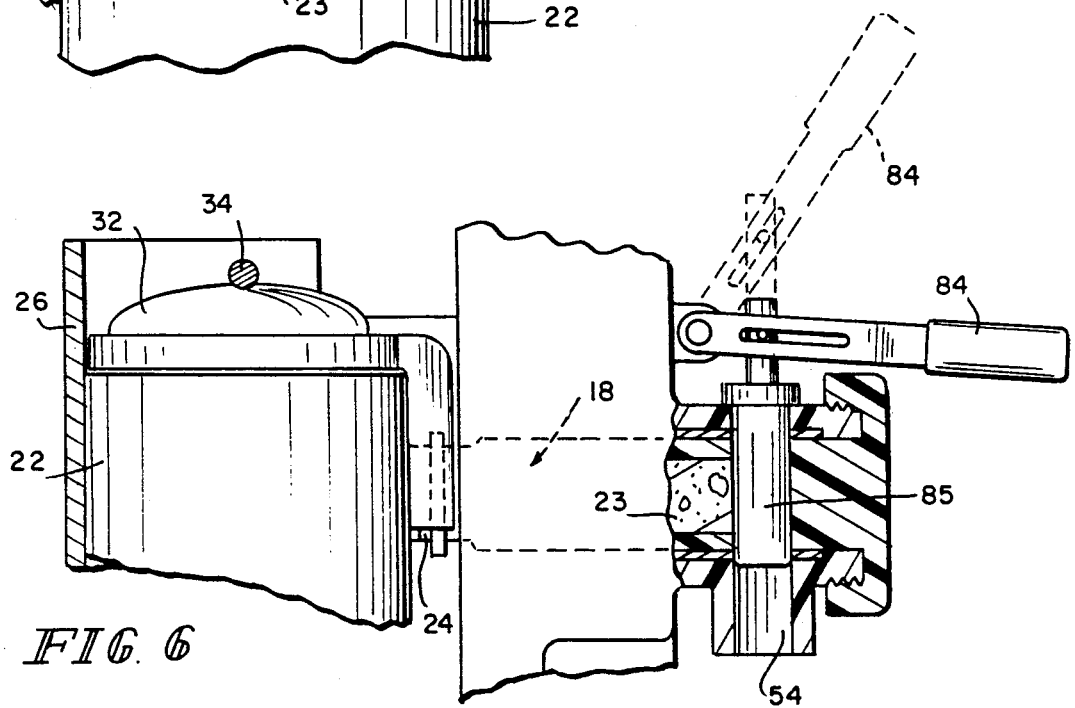
FIG. 6 is a partial side view of the dispensing section, showing a lever actuated blocking means for the dispensing conduit.

FIG. 6 is a side view illustrating an alternative blocking arrangement. Specifically, the soft serve frozen confection 23 is blocked from flow through spigot 54 by a vertical action plunger 85. A manual lever 84 can be raised (shown in dotted line) to allow dispensing of the soft serve frozen confection 23 or lowered to a horizontal position (shown in solid line), blocking flow of the soft serve confection through the spigot 54.

Figure 7:
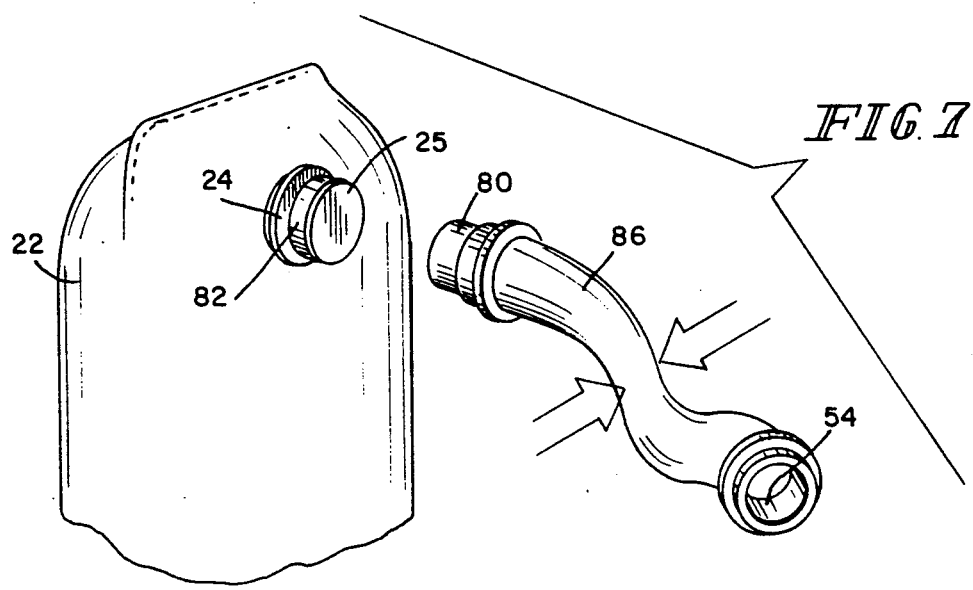
FIG. 7 is a view of a flexible dispensing conduit, with a blocking means through constriction of the flexible dispensing conduit.

FIG. 7 is a view of an alternative embodiment of a dispensing conduit and blocking arrangement. In this embodiment, a flexible conduit 86 acts to conduct the soft serve frozen confection 23 from the collapsible container 22 to an integral dispensing spigot 54. The blocking arrangement can be realized by constriction of the flexible conduit 86 in an area preferably near the dispensing spigot 54 by a constriction device (not shown). The flexible conduit 86 can be constructed of either disposable or reusable materials.

FIG. 8 shows yet another embodiment of the invention with the collapsible conduit 86 being fitted with a decorative tip 88. The decorative tip 88 can be constructed in any desired shape consistent with easy flow of the soft serve frozen confection through the decorative tip 88.

FIG. 9 is yet another embodiment of the invention that utilizes a flexible container outlet 94 that unrolls into the dispensing conduit 18 when subjected to the pressures caused by the extruding soft serve frozen confection 23. During transport or storage of the collapsible container 22, the flexible container outlet 94 is rolled up in a collapsed condition (shown in solid line) and can be sealed at the end to prevent contamination. Before dispensing the soft serve frozen confection 23, the seal of the flexible container outlet 94 is broken and the flexible container outlet is situated inside the dispensing conduit 18. When the soft serve frozen confection 23 is compressed, the pressure serves to unwind the flexible container outlet 94 in the dispensing conduit 18 (shown in dotted line), permitting flow of the soft serve frozen confection 23 into the dispensing conduit 18.

Although the invention has been described in detail with reference to specific preferred embodiments and specific examples, variations and modifications exist within the scope of the invention as described in the following claims.

What is claimed is:

1. A soft serve frozen confection dispensing apparatus comprising
   a collapsible container for holding a frozen confection, said collapsible container having a collapsible container outlet of sufficient size to allow extrusion of the frozen confection,
   an outlet conduit for receiving the extruded frozen confection, said outlet conduit including valve means for controlling the extrusion of the frozen confection,
   compression means for compressing the collapsible container to extrude the frozen confection from the collapsible container into the outlet conduit,
   freezer means for maintaining the temperature within the dispensing apparatus substantially within the normal soft serve frozen confection dispensing temperature, and
   thermal insulation means surrounding said collapsible container within the dispensing apparatus for maintaining said collapsible container at a constant temperature ideal for dispensing a soft serve frozen confection, the apparatus including storage means for holding the tempering replacement collapsible containers filled with a soft serve frozen confection, said storage means including an access door.

2. The soft serve frozen confection dispensing apparatus according to claim 1, wherein the collapsible container outlet is of sufficient size to allow extrusion of a soft serve frozen confection having contained nutmeats, candies, fruits, or similar additive flavorants.

3. The soft serve frozen confection dispensing apparatus according to claim 1, wherein the collapsible container outlet includes an attached sleeve capable of flexible unwinding in the outlet conduit.

4. The soft serve frozen confection dispensing apparatus according to claim 1, wherein said valve means comprises a rotating action shut-off spigot.

5. The soft serve frozen confection dispensing apparatus according to claim 1, wherein said valve means comprises an outlet conduit constructed of a flexible material and outlet conduit constriction means for controlling extrusion of a soft serve frozen confection through said outlet conduit.

6. The soft serve frozen confection dispensing apparatus according to claim 1, wherein said freezer means consists of dry ice, thereby facilitating portability of said soft serve frozen confection dispenser.

7. The soft serve frozen confection dispensing apparatus according to claim 1, wherein said compression means comprises a compressed air tank pressurizing an air pressure expandable bellows, thereby facilitating portability of said soft serve frozen confection dispenser.

8. A soft serve frozen confection dispensing apparatus comprising
   a collapsible container for holding a frozen confection, said collapsible container having a collapsible container outlet of sufficient size to allow extrusion of the frozen confection,
   an outlet conduit for receiving the extruded frozen confection, said outlet conduit including valve means for controlling the extrusion of the frozen confection,
   compression means for compressing the collapsible container to extrude the frozen confection from the collapsible container into the outlet conduit,
   freezer means for maintaining the temperature within the dispensing apparatus substantially within the normal soft serve frozen confection dispensing temperature, and
   thermal insulation means surrounding said collapsible container within the dispensing apparatus for maintaining said collapsible container at a constant temperature ideal for dispensing a soft serve frozen confection, the compression means comprising an air pressure expandable bellows assembly, the air pressure expandable bellows assembly including a pressure relief valve, the pressure relief valve being automatically opened when the access door is opened, thereby relieving pressure in the air pressure expandable bellows.

9. A soft serve frozen confection dispensing apparatus comprising
   a container for holding a frozen confection,
   means for cooling the container and any frozen confection held therein to a temperature selected to maintain the frozen confections in a soft serve condition,
   thermal insulation means appended to the cooling means for maintaining the container and any frozen confection held therein at a constant temperature,
   means for dispensing a soft serve frozen confection from the container to a point of use at the constant temperature, and
   storage means for holding and tempering replacement collapsible containers filled with a soft serve frozen confection, the storage means including an access door.

10. The soft serve frozen confection dispensing apparatus of claim 9, wherein said cooling means maintains the container and any frozen confection held therein at a constant temperature between 17° F. and 21° F.

11. The soft serve frozen confection dispensing apparatus of claim 9, wherein said thermal insulation means is a layer of foam appended to the cooling means to define an insulated region surrounding the container.

12. A frozen confection-dispensing apparatus comprising
   a container for holding frozen confection,
   means for tempering frozen confection in the container to transform frozen confection in the container from a hard frozen condition at a first subfreezing temperature to a soft serve condition at a higher second subfreezing temperature,
   thermal insulation means for maintaining the container and any tempered frozen confection therein at the second subfreezing temperature without any fluctuation to preserve the tempered frozen confection in a soft serve condition, and
   means for dispensing tempered frozen confection from the container to a point of use in a soft serve condition at the second subfreezing temperature.

13. A frozen confection-dispensing apparatus comprising
   a container for holding a frozen confection,
   a hollow casing for holding at least one container,
   means for establishing a predetermined subfreezing temperature in the hollow casing to temper any frozen confection in a container held in the hollow casing so that frozen confection held in a container in a hard frozen condition at a subfreezing temperature lower than the predetermined temperature is transformed over time to a soft serve condition at the higher predetermined subfreezing temperature upon deposit of said container in the hollow casing, thermal insulation means for maintaining the container and any tempered frozen confection therein at the predetermined subfreezing temperature without fluctuation to preserve the tempered frozen confection in a soft serve condition, and means for dispensing tempered frozen confection from the container in the hollow casing to a point of use outside the hollow casing in a soft serve condition at the second subfreezing temperature.

14. A frozen confection-dispensing apparatus comprising a collapsible container formed to include an interior chamber configured to hold a frozen confection therein, the collapsible container having a discharge outlet configured to extrude frozen confection discharged from the interior chamber, a hollow casing formed to include an interior region holding at least one collapsible container therein, refrigeration means for establishing a predetermined subfreezing temperature in the interior region of the hollow casing to cool the interior region and the at least one collapsible container held therein, thermal insulation means situated in the interior region for maintaining the collapsible container and any frozen confection therein at the predetermined subfreezing temperature without any fluctuation although the temperature in the interior region outside of the thermal insulation means fluctuates about the predetermined subfreezing temperature so that the frozen confection in the at least one collapsible container is preserved in a soft serve condition at said predetermined subfreezing temperature, and means for dispensing frozen confection from the collapsible container to a point of use in a soft serve condition at said predetermined subfreezing temperature.

* * * * *